United States Patent
Dogra et al.

(10) Patent No.: US 11,768,924 B2
(45) Date of Patent: Sep. 26, 2023

(54) HVAC AUTHENTICATION SYSTEM AND METHOD

(71) Applicant: Goodman Manufacturing Company, L.P., Waller, TX (US)

(72) Inventors: Adway Dogra, Cypress, TX (US); Roberto Flores, Tulsa, OK (US)

(73) Assignee: Goodman Manufacturing Company, L.P., Waller, TX (US)

( * ) Notice: Subject to any disclaimer, the term of this patent is extended or adjusted under 35 U.S.C. 154(b) by 0 days.

(21) Appl. No.: 16/888,718

(22) Filed: May 30, 2020

(65) Prior Publication Data

US 2020/0380098 A1 Dec. 3, 2020

Related U.S. Application Data

(60) Provisional application No. 62/855,787, filed on May 31, 2019.

(51) Int. Cl.
| | | |
|---|---|---|
| *G06F 21/31* | (2013.01) | |
| *H04W 12/06* | (2021.01) | |
| *F24F 11/56* | (2018.01) | |
| *H04W 4/80* | (2018.01) | |
| *H04L 9/40* | (2022.01) | |
| *H04W 12/50* | (2021.01) | |

(52) U.S. Cl.
CPC .............. *G06F 21/31* (2013.01); *F24F 11/56* (2018.01); *H04L 63/08* (2013.01); *H04W 4/80* (2018.02); *H04W 12/06* (2013.01); *H04W 12/50* (2021.01)

(58) Field of Classification Search
CPC ........ H04L 12/06; H04L 63/08; H04W 12/50; H04W 4/80; F24F 11/56; G06F 21/31
See application file for complete search history.

(56) References Cited

U.S. PATENT DOCUMENTS

| | | | |
|---|---|---|---|
| 8,473,109 B1 * | 6/2013 | Imes | F24F 11/30 700/277 |
| 10,491,734 B1 * | 11/2019 | Annasagaram Krishnamurthy | .... H04W 12/50 |
| 2014/0350732 A1 * | 11/2014 | Kucera | F24F 11/64 700/276 |
| 2015/0109104 A1 * | 4/2015 | Fadell | H04L 67/12 340/5.65 |
| 2015/0127173 A1 * | 5/2015 | Chinnaiyan | G05B 15/02 700/276 |
| 2016/0211985 A1 * | 7/2016 | Castillo | F24F 11/62 |
| 2016/0261425 A1 * | 9/2016 | Horton | G05D 23/1917 |
| 2017/0012821 A1 * | 1/2017 | Sa | H04W 24/04 |
| 2018/0103022 A1 * | 4/2018 | Tokunaga | H04L 63/0853 |
| 2019/0206004 A1 * | 7/2019 | Shelton, IV | G06Q 10/10 |
| 2020/0136677 A1 * | 4/2020 | Rumler | F24F 11/30 |

* cited by examiner

*Primary Examiner* — Tongoc Tran
(74) *Attorney, Agent, or Firm* — K&L Gates LLP

(57) ABSTRACT

An authentication method and system for an HVAC system are provided. Embodiments of the present disclosure generally relate to an access-control or authentication system for an HVAC system, in which access to certain functions of the HVAC system is conditioned on a user performing certain basic operational instructions for the HVAC system in a provided sequence, thereby providing evidence that the user has authorization to access and operate the HVAC system wirelessly.

17 Claims, 6 Drawing Sheets

HVAC AUTHENTICATION SYSTEM AND METHOD

CROSS-REFERENCE TO RELATED APPLICATIONS

This application claims priority to and benefit of U.S. Provisional Patent Application No. 62/855,787, entitled "HVAC Authentication System and Method," filed on May 31, 2019, and which is herein incorporated by reference in its entirety.

BACKGROUND

This section is intended to introduce the reader to various aspects of the art that may be related to various aspects of the presently described embodiments—to help facilitate a better understanding of those embodiments. Accordingly, it should be understood that these statements are to be read in this light, and not as admissions of prior art.

Modern residential and industrial customers expect indoor spaces to be climate controlled. In general, heating, ventilation, and air-conditioning ("HVAC") systems circulate an indoor space's air over low-temperature (for cooling) or high-temperature (for heating) sources, thereby adjusting the indoor space's air temperature. HVAC systems generate these low- and high-temperature sources by, among other techniques, taking advantage of a well-known physical principle: a fluid transitioning from gas to liquid releases heat, while a fluid transitioning from liquid to gas absorbs heat.

Within a typical HVAC system, a fluid refrigerant circulates through a closed loop of tubing that uses compressors and other flow-control devices to manipulate the refrigerant's flow and pressure, causing the refrigerant to cycle between the liquid and gas phases. Generally, these phase transitions occur within the HVAC's heat exchangers, which are part of the closed loop and designed to transfer heat between the circulating refrigerant and flowing ambient air. As would be expected, the heat exchanger providing heating or cooling to the climate-controlled space or structure is described adjectivally as being "indoors," and the heat exchanger transferring heat with the surrounding outdoor environment is described as being "outdoors."

Typically, the operation of the HVAC system is managed by a controller that "calls" for the activation or deactivation of various components within the system. For example, the controller may be a thermostat that can be operated to place a call to the system to heat or cool the indoor air, or to call for activation of a fan (blower) to drive circulation of the indoor air. More specifically, the controller may place a call to the control circuitry of the HVAC system that, in turn, manages the functions of the HVAC system's components to produce the result requested by the call.

Property owners or dwellers may contact a professional technician to install or maintain the property's HVAC system. To provide effective service, the technician may need to access certain functions (settings, stored history, stored data, firmware) of the HVAC system—which, in certain instances, is done through a wireless communication system as described in U.S. patent application Ser. No. 15/043,134, which entitled is "Systems and Methods for Air Temperature Control Using a Target Time Based Control Plan," was filed on Feb. 12, 2016, by Goodman Manufacturing Company, L.P., and is herein incorporated by reference in its entirety.

It would be advantageous to provide systems and methods that improve the security surrounding access to the HVAC system's various functions.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present disclosure generally relate to an access-control or authentication system for an HVAC system, in which access to certain functions of the HVAC system is conditioned on a user performing certain basic operational instructions for the HVAC system in a provided sequence, thereby providing evidence that the user has authorization to access and operate the HVAC system wirelessly.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present disclosure will be described below. In an effort to provide a concise description of these embodiments, all features of an actual implementation may not be described. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements.

Figure 1:
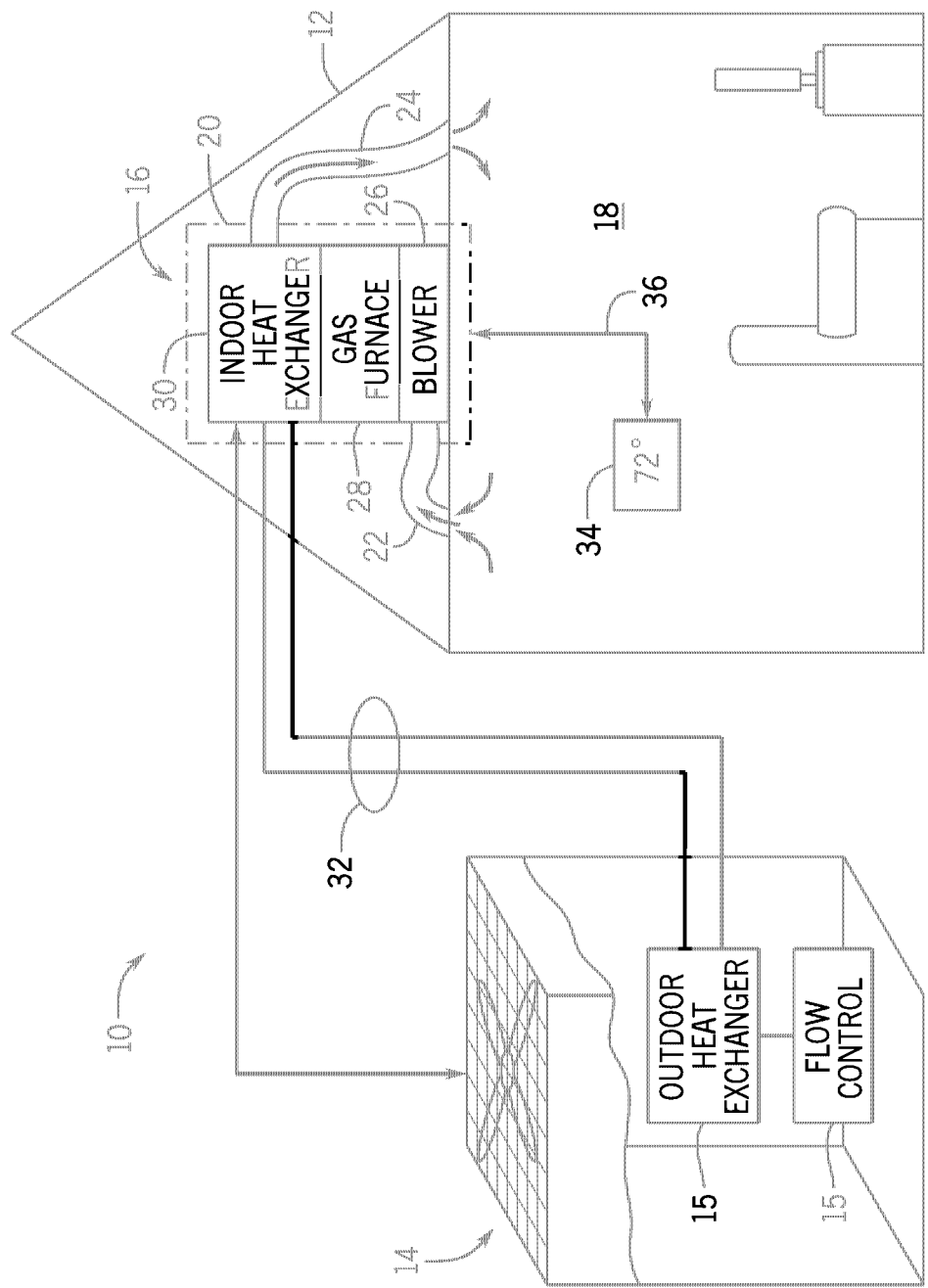
FIG. 1 illustrates schematically an HVAC system for heating and cooling indoor spaces within a structure, in accordance with an embodiment of the present disclosure.

Turning now the figures, FIG. 1 illustrates an HVAC system 10 in accordance with one embodiment. As depicted, the system 10 provides heating and cooling for a residential structure 12. But the concepts disclosed herein are applicable to a myriad of heating and cooling situations, including industrial and commercial settings.

The described HVAC system 10 divides into two primary portions: The outdoor unit 14, which mainly comprises components 15 (e.g., flow control devices for circulating refrigerant, valves, compressors, or an outdoor heat exchanger) for transferring heat with the environment outside the structure 12; and the indoor unit 16, which mainly comprises components for transferring heat with the air inside the structure 12. In the illustrated structure, a ducted indoor unit 16 provides heating and cooling to various indoor spaces 18.

The ducted indoor unit 16 has an air-handling unit (or AHU) 20 that provides airflow circulation, which in the illustrated embodiment draws ambient indoor air via returns 22, passes that air over one or more heating/cooling elements (i.e., sources of heating or cooling), and then routes that conditioned air, whether heated or cooled, back to the various climate-controlled spaces 18 through ducts or ductworks 24—which are relatively large pipes that may be rigid or flexible. A blower 26 provides the motivational force to circulate the ambient air through the returns 22, AHU, and ducts 24.

As shown, the ducted indoor unit 16 is a heating and cooling system that has multiple elements. A gas furnace 28, which may be located downstream (in terms of airflow) of the blower 26, combusts natural gas to produce heat in furnace tubes (not shown) that coil through the furnace. These furnace tubes act as a heating element for the ambient indoor air being pushed out of the blower 26, over the furnace tubes, and into the ducts 24.

To cool the indoor space 18, the indoor air may be guided over the indoor heat exchanger 30, with the heat in the ambient air being drawn into the refrigerant circulating through the indoor heat exchanger 30. The blower, gas furnace, and indoor heat exchanger may be packaged as an integrated AHU, or those components may be modular. Moreover, it is envisaged that the positions of the gas furnace and indoor heat exchangers or blower can be reversed or rearranged.

The indoor heat exchanger 30—which in this embodiment for the ducted indoor unit 16 is an A-coil, as it known in the industry—acts as a cooling element that removes heat from the structure by manipulating the pressure and flow of refrigerant circulating within and between the A-coil and the outdoor unit 14 via refrigerant lines 32. But, by reversing the flow of the refrigerant, the indoor heat exchanger 30 can act as a "heat pump" by transferring heat to the circulating ambient air and, in turn, heating the indoor space 18.

The HVAC system 10 may be operated or adjusted by a controller, such as thermostat 34, which acts as a user interface to the HVAC system via a wired connection 36 or a wireless connection (e.g., wi-fi, LAN, Bluetooth, cellular signal). In the illustrated embodiment, the thermostat 34 is a "24-volt thermostat" that can send signals to, but cannot receive signals from, the indoor unit 20. But in alternate embodiments, the thermostat and the HVAC system may be "communicating" such that the HVAC system (and components thereof) and the thermostat are capable of sending and receiving information and signals to and from one another.

Figure 2:
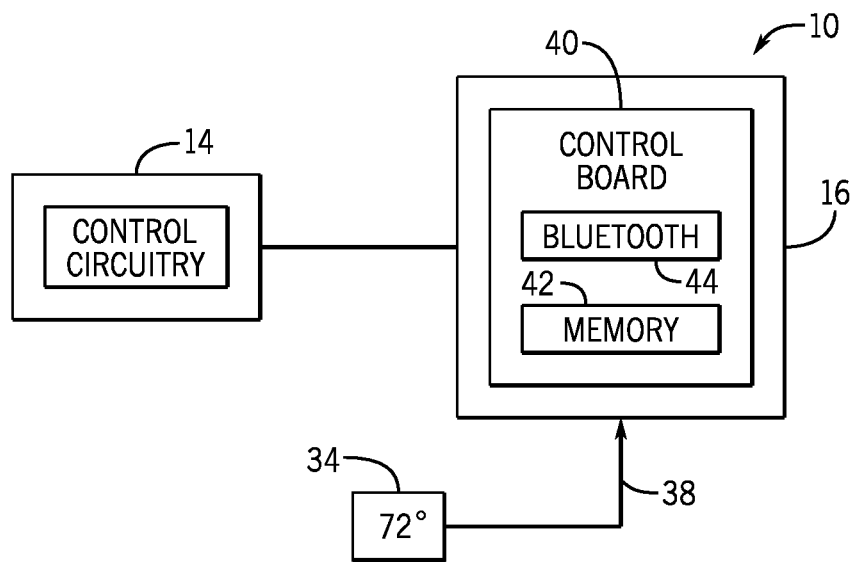
FIG. 2 illustrates schematically a communication network for an HVAC system, in accordance with an embodiment of the present invention.

FIG. 2 schematically illustrates exemplary communication pathways amongst a "24 volt" thermostat 34 and the HVAC system 10. In the illustrated embodiment, the "24 volt" thermostat 34 may send a call signal over wire 36 to the HVAC system 10, to activate a certain function on the HVAC system. For example, the thermostat may send a "Y" call that instructs the HVAC system to perform cooling, to cool the indoor space 18. The thermostat may also send a "W" or "G" call that instructs the HVAC perform heating or activate the blower 26, respectively. Alternatively, the calls may be placed manually by the technician bypassing the thermostat and causing the circuit to close, thereby providing the desired call.

That call is communicated 38—typically by wire 36 but potentially wirelessly—to a control board 40 that is located in the HVAC system 10, in this case in the indoor unit 16. The control board 40 processes the call and then coordinates the operation of various components within the HVAC system. For example, the control board 40 may instruct components in the outdoor unit 16 to begin circulation of refrigerant to effect cooling. Or the control board may instruct the gas furnace to activate to effect heating. Further still, the control board 40 may instruct the blower 26 to circulate air. To assist in these commands, the control board 40 may include memory 42 that contains operating instruction based on the call provided. Moreover, the outdoor unit may include its own circuitry to facilitate operation of the HVAC system's components.

In the illustrated embodiment, indoor unit includes a communication device 44 that facilitates user communication with the HVAC system independent of the thermostat. For example, the communication device 44 may be a transceiver (e.g., Bluetooth transceiver, wi-fi transceiver, cellular transceiver) that is connected by wire to the HVAC system's control board 40 but can communicate wirelessly with the user. (It is also envisaged that the communication device could communicate with the control board 40 wirelessly.)

In certain instances, it may be beneficial for a service technician to communicate with the HVAC system. For example, the service technician may wish to place the HVAC system into a test mode, access data or information stored on the HVAC system, operate the HVAC system, or update the HVAC system's firmware. One way to accomplish this is to create a wired connection between the HVAC system and a portable device the technician may have. Alternatively, that connection can be made wirelessly.

Figure 3:
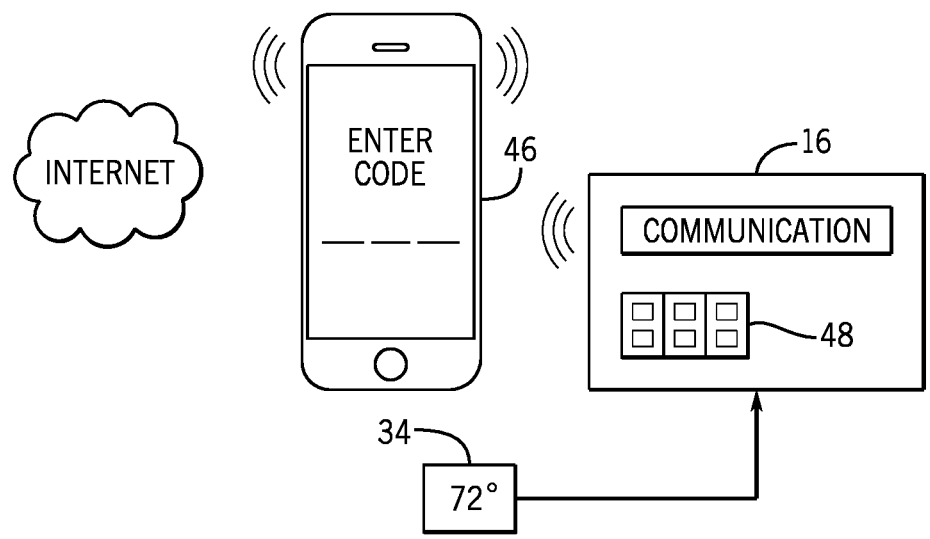
FIG. 3 illustrates schematically an authentication network for pairing a portable device with an HVAC system, in accordance with an embodiment of the present invention.
Figure 4:
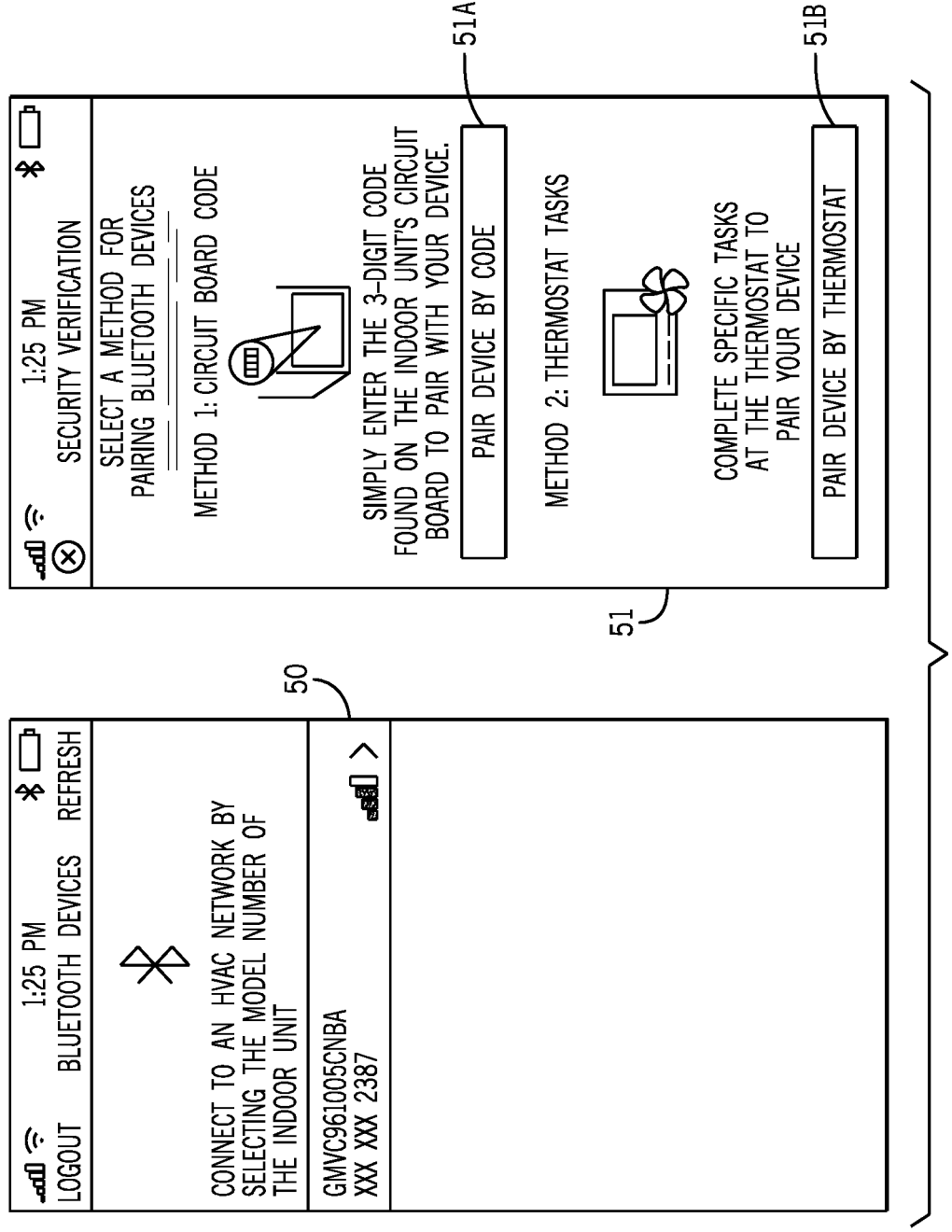
FIGS. 4, 5, 6, and 7 illustrate screenshots of software that may be on the portable device for communicating with the HVAC system, in accordance with an embodiment of the present invention.

As illustrated in FIG. 3, the technician may have a portable device 46 (e.g., laptop, cellular phone, tablet) that can assist in the diagnosis and service of the HVAC system. And this portable device 46 (which may be connected to the internet) may have the ability to communicate wirelessly over a wireless protocol, such as Bluetooth, wi-fi protocols, or a cellular signal. Since both the indoor unit 16 and the portable device 46 are capable of wireless communication, the portable device may connect to the HVAC system wirelessly, allowing the technician to communicate with the HVAC system independent of the thermostat. The portable device may have software (e.g., app, programming) that provides an HMI that makes it easier to manage on the portable device the information transmitted to or received from the HVAC system. Advantageously, this wireless communication makes it easier for the technician, who may have to connect to an awkwardly located mechanical connector located on the HVAC system if the connection were made through a wire.

In certain instances, it is desirable to permit wireless connection to the HVAC system only when the service technician or user can provide evidence of possession and control of the HVAC system. That is, the technician can present proof-of-possession for the HVAC system. Some HVAC systems may use proximity-based security, in which the HVAC system transmits a low-power wireless signal during quiescent operation that can only be detected by the portable device is in close proximity (1-2 meters) to the indoor unit. If the portable device 46 is close enough to the indoor unit, the HVAC system may pair (and thus communicate) with the device and increase the wireless signal strength, allowing the technician to maintain communication between the portable device and the HVAC system while the technician is servicing components that may be located further away from the indoor unit. Moreover, once paired, the HVAC system may allow the portable device to access additional functionality on the HVAC system beyond just the pairing function, such additional functionality allowing, for example, the technician to operate the HVAC system, place the HVAC system into a test mode, or access historical information or update the firmware located on the HVAC system—all through the portable device.

For further security, the HVAC system may still employ this initial proximity-based pairing but provide an additional layer of security to access the additional functions. Upon initial pairing with the portable device, the control board 40 may generate a three-digit code that is displayed on a seven-segment display 48 located in the indoor unit. The technician must then enter the three-digit code into his or her portable device, which is then communicated to the control board, to unlock the additional functionality of the HVAC system that can be accessed from the portable device.

But, in certain instances, the indoor unit 16 may be installed in such a way that it would be difficult for the technician to access or see the display 48. For example, the display may be located access panel on the indoor unit. And even if a small window in the access panel is provided, it may be difficult to see the display. Or the indoor unit may be installed such that the window or access panel are difficult to get to.

As an alternative, the additional security—and proof-of-possession of the HVAC system—may be effected by requiring the technician to operate the thermostat 34 to provide or remove a certain sequence of call signals to the HVAC system. For example, to unlock the access functionality of the HVAC unit through the portable device, the technician may first have to place the portable device in proximity with the HVAC unit, to effect the initial paring. After that, the HVAC system will communicate a series of instructions to the portable device to allow the technician to unlock the additional functions.

As one example, the technician may be instructed to operate the thermostat such that it places a cooling call within three minutes of the initial pairing. Once the HVAC system detects a cooling call, the technician may then be instructed to operate the thermostat to remove the cooling call within two minutes. After that, the technician may be instructed to place a heating call within three minutes of the cooling call. Such a sequence of events is extremely unlikely to occur during normal operations, evidencing that the technician has access to the property and thus the authority to operate the HVAC system through the portable device.

As another example, the technician may be instructed, through the portable device's software once the device and the HVAC system are initially paired, to remove all calls within five minutes, provide a cooling call within eight minutes of removing all calls, and then terminate the cooling call within two minutes after requesting the cooling call.

As yet another example, the technician may be instructed to remove all calls within five minutes, place a blower call within eight minutes of removing all calls, and then remove the blower call within two minutes of placing the fan call.

Advantageously, the HVAC system may be programmed to rotate through various permutations and combinations of the instructions each time pairing with a portable device is requested. Moreover, this instruction-based access may be "locked out" and disabled if multiple the instructions are not properly performed within a prescribed amount of time (e.g., 60 minutes). And the instruction-based access may be reactivated by, for example, requiring the technician to use the code provided by the three-digit display.

The HVAC system may also have a time-based termination of access to the additional functions for the portable device. For example, the HVAC system may terminate the access to the portable device if it has not detected communications with the portable device in 120 minutes.

Turning to FIGS. 4, 5 6, and 7, these figures illustrate a series of screen shots that may be displayed on the portable device during the authentication process, demonstrating the underlying method. For example, when the portable device is brought into close proximity to the HVAC system's control board 40 or the transceiver 44, the portable device may display screen 50, which identifies the HVAC system the portable device is pairing with. At this point, the technician is provided a choice of which method of authentication to use through display screen 51: The technician may select to use the code displayed by the indoor unit (screen portion 51A) or select to operate the thermostat 34 (screen portion 51B).

Figure 5:
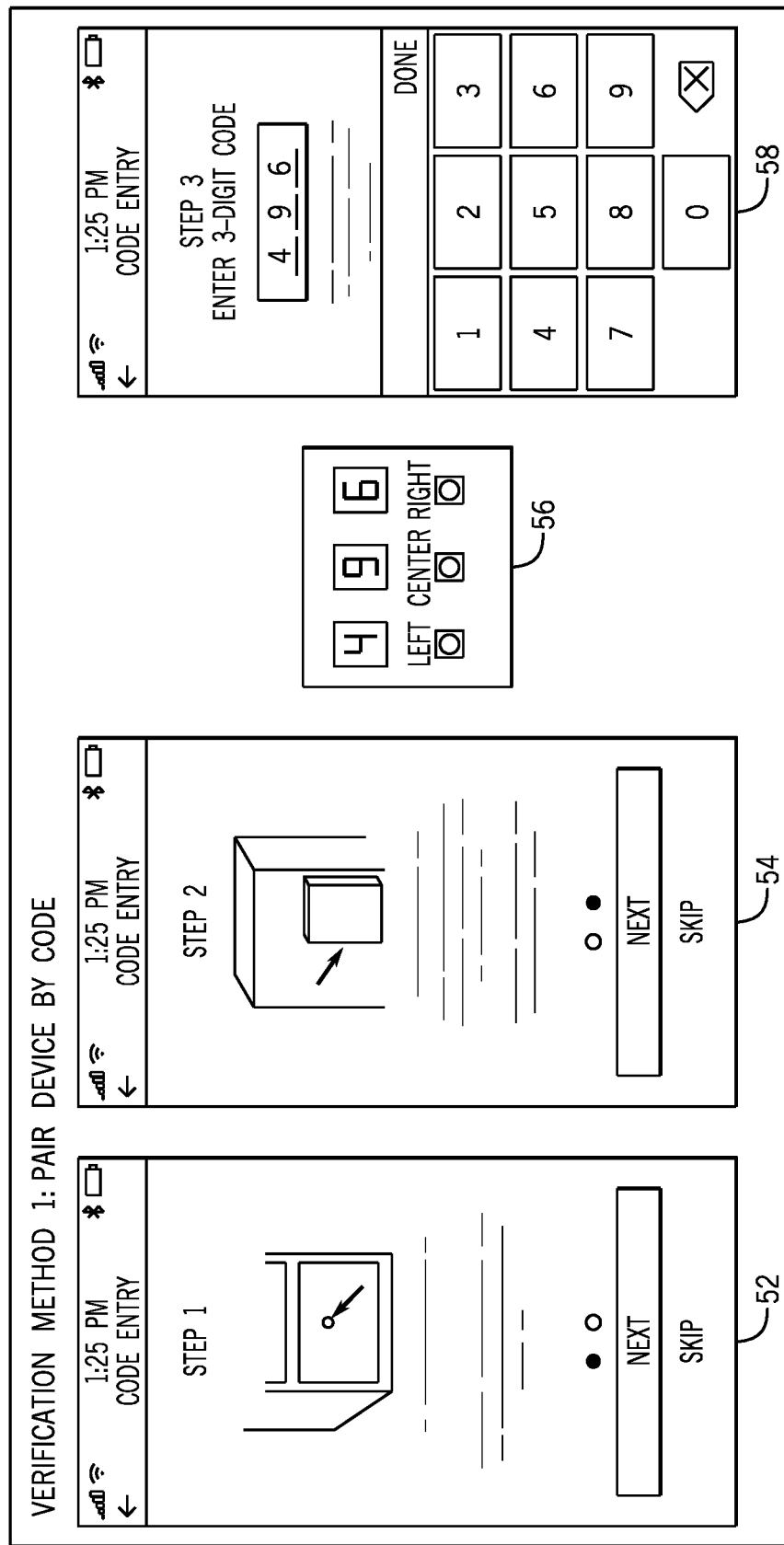

If the technician chooses to use the code, he or she will be directed to locate the code on the indoor unit (screens 52 and 54) and then enter the code displayed by indoor unit (image 56) into the portable device (screen 58), as illustrated in FIG. 5.

Figure 6:
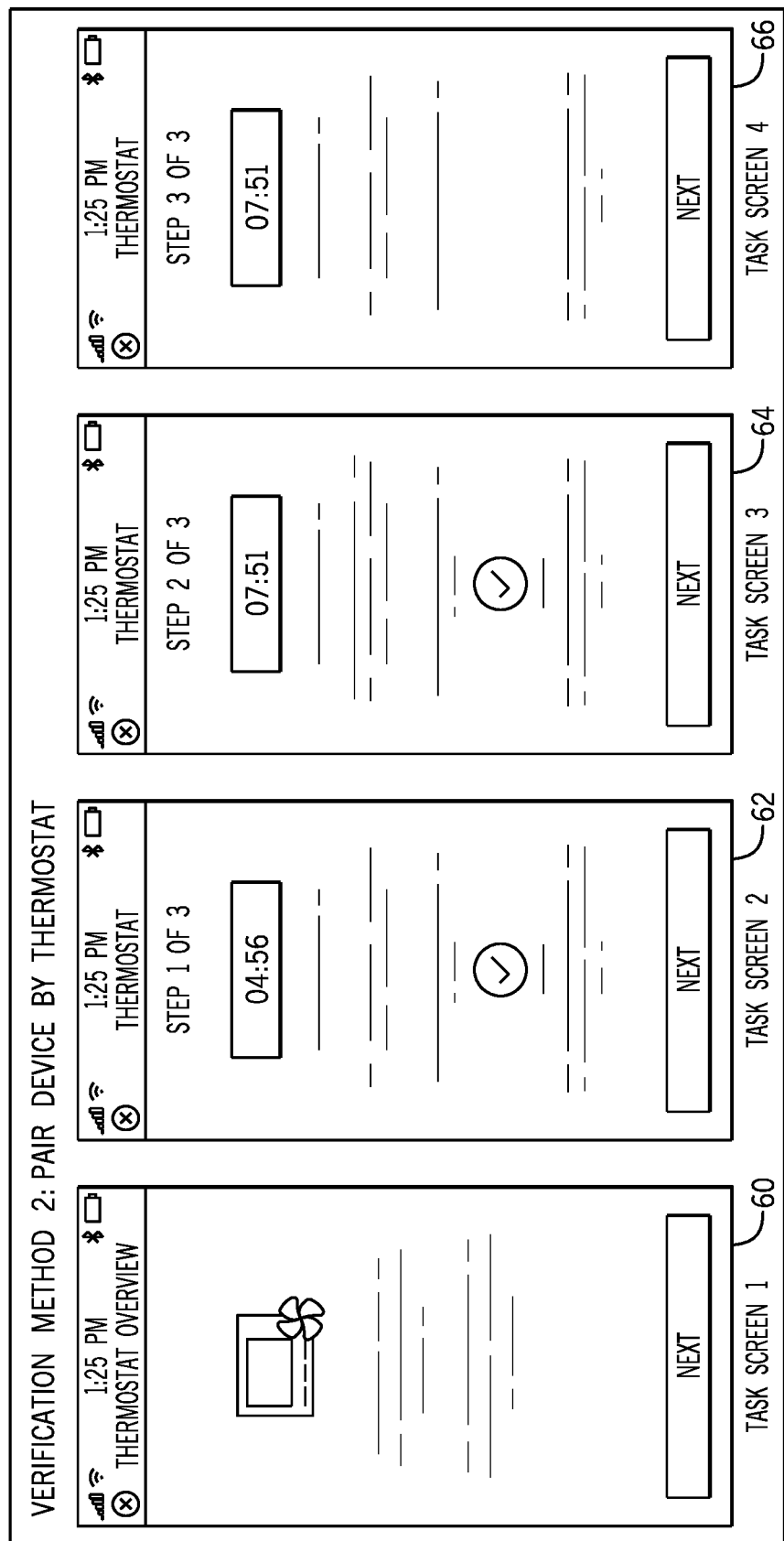

Alternatively, as illustrated in FIG. 6, if the technician chooses to perform the operations or tasks on the thermostat, he or she is taken to screen 60. At this point, the technician is provided a first task or instruction to perform on the HVAC system in a given amount of time. (Screen 62.) The technician is given a second task or instruction to perform once the first instruction has been completed, again in a given amount of time. (Screen 64.) Then the final instruction is given (screen 66), at which point the technician returns into close proximity to the indoor unit, such that the indoor unit can confirm to the portable device that the instructions have been performed.

Figure 7:
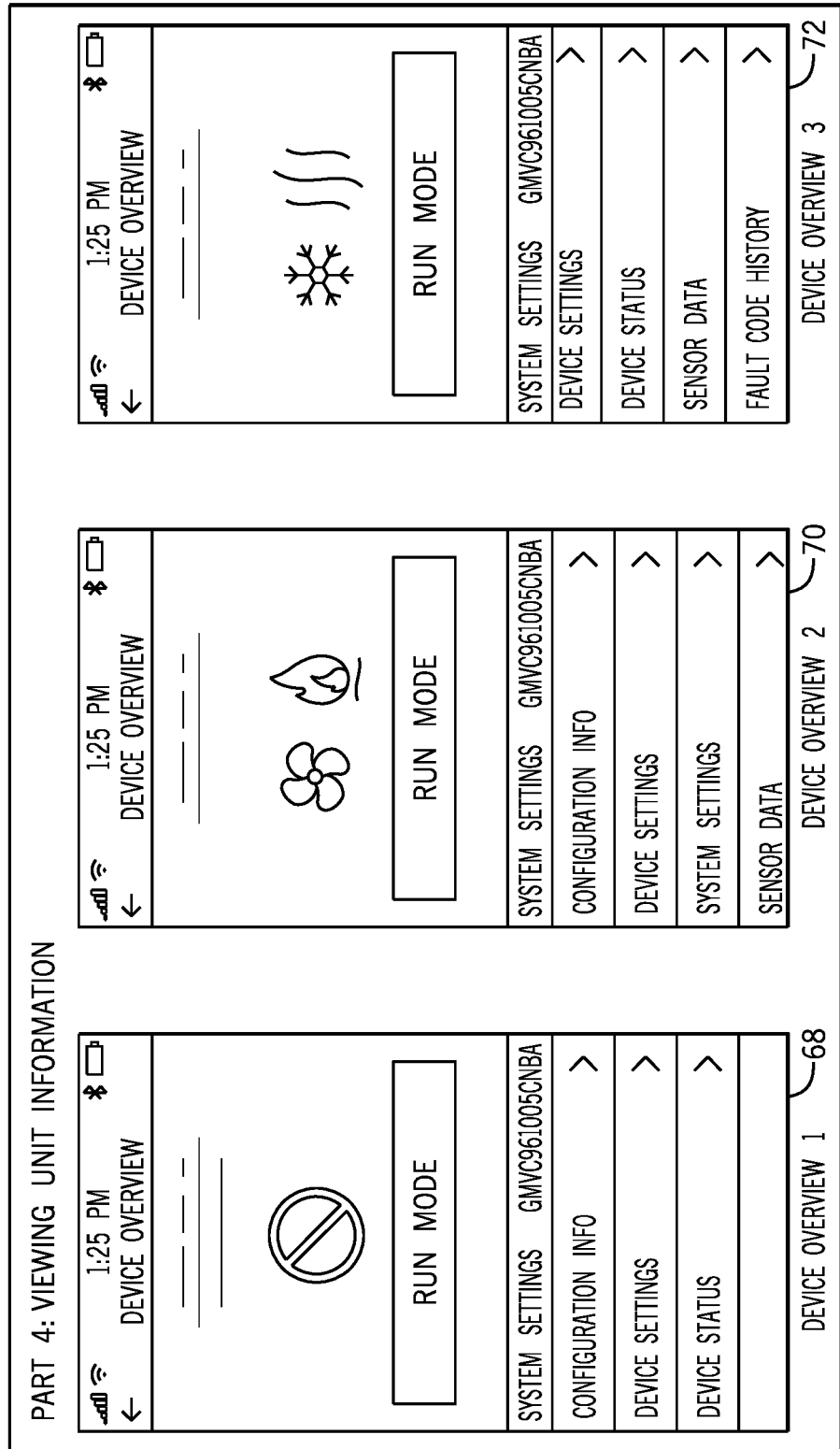

By completing the plurality of instructions, the wireless transceiver may transition to a higher-power signal that maintains pairing with the portable device at a greater distance, and permits access to various functions on the HVAC device. For example, as illustrated in FIG. 7, the HVAC system may permit the technician to view the HVAC system's configuration (screen 68), or place various components of the HVAC system into different run modes (screens 70 or 72).

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method for authenticating a user for an HVAC system of a structure, the method comprising:
    generating a wireless signal with the HVAC system at a low-power signal strength with a communication device that is part of an indoor unit of the HVAC system;
    detecting the wireless signal with a portable device carried by the user and effecting an initial proximity-based wireless communication pairing function between the portable device and the communication device only if the portable device is in close physical proximity to, and thus the user has access to, the indoor unit;
    providing, via the HVAC system, a plurality of instructions for operating the HVAC system in a provided sequence to the portable device for the user to perform;
    physically operating a thermostat at the structure to operate the HVAC system to perform the plurality of instructions; and
    pairing the HVAC system with the portable device for wireless communication if the HVAC system detects the plurality of instructions have been performed by the user, thus providing evidence that the user has possession and control of and authorization to access and operate the HVAC system;
    once paired, increasing the signal strength of the wireless signal to allow the user to maintain wireless communication between the portable device and the HVAC system while no longer in close proximity to the indoor unit; and
    once paired, permitting the portable device to access at least one additional function of the HVAC system.

2. The method of claim 1, wherein the wireless signal generated at a low-power signal strength is a Bluetooth signal with a signal strength requiring the portable device to be within 1 or 2 meters of the indoor unit.

3. The method of claim 1, further comprising physically operating a thermostat at the structure to operate the HVAC system to perform the plurality of instructions and wherein the plurality of instructions further includes instructions for the placement or removal of a first call signal by the user from the thermostat and the placement or removal of a second call signal by the user from the thermostat.

4. The method of claim 3, wherein the plurality of instructions further includes a prescribed time between the placement or removal of the first call signal and the placement or removal of the second call signal.

5. The method of claim 3, wherein the plurality of instructions further includes instructions for the placement or removal of a third call signal by the user from the thermostat.

6. The method of claim 3, wherein the first or second call is cooling.

7. The method of claim 3, wherein the first or second call is heating.

8. The method of claim 3, wherein the first or second call is a blower call.

9. A system for authenticating a user for an HVAC system of a structure, the system comprising:
    an HVAC system comprising a thermostat and an indoor unit comprising a communication device, the HVAC system configured to:
        generate a wireless signal at a low-power signal strength with the communication device;
        effect an initial proximity-based wireless communication pairing function between the communication device and a portable device carried by the user when the wireless signal is detected by the portable device only if the portable device is in close physical proximity to, and thus the user has access to, the indoor unit;
        provide a plurality of instructions for operating the HVAC system in a provided sequence to the portable device for the user to perform using the portable device; and
        pair the HVAC system with the portable device for wireless communication if the HVAC system detects the plurality of instructions have been performed by the user using the portable device, thus providing evidence that the user has possession and control of and authorization to access and operate the HVAC system;
        once paired, increase the signal strength of the wireless signal to allow the user to maintain wireless communication between the portable device and the HVAC system while no longer in close proximity to the indoor unit; and
        once paired, permitting the portable device access to at least one additional function of the HVAC system.

10. The system of claim 9, wherein the plurality of instructions further includes instructions for the placement or removal of a first call signal by the user from the thermostat and the placement or removal of a second call signal by the user from the thermostat.

11. The system of claim 10, wherein the plurality of instructions further includes a prescribed time between the placement or removal of the first call signal and the placement or removal of the second call signal.

12. The system of claim 10, wherein the plurality of instructions further includes instructions for the placement or removal of a third first call signal by the user from the thermostat.

13. The system of claim 9, wherein the HVAC system includes a control board and a Bluetooth transceiver operable to effect wireless communication between the portable device and the control board.

14. A method for authenticating a user for an HVAC system, the method comprising:
    generating a wireless signal with the HVAC system at a low-power signal strength with a communication device that is separate from a thermostat;
    detecting the wireless signal with a portable device carried by the user and effecting an initial proximity-based wireless communication pairing function between the portable device and the communication device only if the portable device is in close physical proximity to, and thus the user has access to, an indoor unit of the HVAC system;
    displaying a code generated by a control board located in the indoor unit to the user on a display of the indoor unit;
    pairing the HVAC system with the portable device for wireless communication if the control board detects the code has been entered by the user on the portable device, thus providing evidence that the user has possession and control of and authorization to access and operate the HVAC system;

once paired, increasing the signal strength of the wireless signal to allow the user to maintain wireless communication between the portable device and the HVAC system while no longer in close proximity to the indoor unit; and once paired, permitting the portable device to access at least one additional function of the HVAC system.

15. The method of claim 14, wherein the wireless signal generated at a low-power signal strength is a Bluetooth signal with a signal strength requiring the portable device to be within 1 or 2 meters of the indoor unit.

16. The method of claim 14, wherein instead of displaying the code and pairing the HVAC system upon detection of the code being entered, alternatively:

providing, via the HVAC system, a plurality of instructions for operating the HVAC system in a provided sequence to the portable device for the user to perform;

physically operating a thermostat at the structure to operate the HVAC system to perform the plurality of instructions; and pairing the HVAC system with the portable device for wireless communication if the HVAC system detects the plurality of instructions have been performed by the user, thus providing evidence that the user has possession and control of and authorization to access and operate the HVAC system.

17. The method of claim 1, wherein instead of providing the plurality of instructions and pairing the HVAC system upon detection of plurality of instructions being performed, alternatively:

displaying a code generated by a control board located in the indoor unit to the user on a display of the indoor unit; and pairing the HVAC system with the portable device for wireless communication if the control board detects the code has been entered by the user on the portable device, thus providing evidence that the user has possession and control of and authorization to access and operate the HVAC system.

* * * * *